United States Patent
Danziger et al.

(10) Patent No.: US 7,961,386 B2
(45) Date of Patent: Jun. 14, 2011

(54) LOW ORBIT MISSILE-SHAPED SATELLITE FOR ELECTRO-OPTICAL EARTH SURVEILLANCE AND OTHER MISSIONS

(75) Inventors: Yochay Danziger, Kfar Vradim (IL); David Mishne, Haifa (IL); Nehemia Miller, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 244 days.

(21) Appl. No.: 12/300,343

(22) PCT Filed: May 13, 2007

(86) PCT No.: PCT/IL2007/000584
§ 371 (c)(1),
(2), (4) Date: Apr. 20, 2009

(87) PCT Pub. No.: WO2007/132460
PCT Pub. Date: Nov. 22, 2007

(65) Prior Publication Data
US 2009/0251773 A1   Oct. 8, 2009

(30) Foreign Application Priority Data

May 11, 2006   (IL) .......................... 175596

(51) Int. Cl.
*G02B 23/00* (2006.01)
*B64G 1/10* (2006.01)

(52) U.S. Cl. ..... 359/399; 359/367; 359/429; 244/158.4; 244/164; 244/171.1

(58) Field of Classification Search .................. 359/399, 359/367, 429; 244/158.4, 158.5, 164, 165, 244/171.1, 171.3; 455/12.1, 427
See application file for complete search history.

(56) References Cited

U.S. PATENT DOCUMENTS

| | | | |
|---|---|---|---|
| 4,101,195 A | 7/1978 | Frosch et al. | |
| 5,190,246 A * | 3/1993 | MacConochie | 244/54 |
| 5,661,610 A | 8/1997 | Pasternak | |
| 6,066,850 A | 5/2000 | Hersom et al. | |
| 6,454,215 B1 * | 9/2002 | Pedreiro | 244/173.1 |
| 6,555,803 B1 * | 4/2003 | Bremer | 250/203.1 |
| 6,674,571 B2 * | 1/2004 | Cerutti-Maori et al. | 359/365 |
| 7,880,964 B1 * | 2/2011 | Wertz et al. | 359/429 |
| 2003/0006345 A1 * | 1/2003 | Guo | 244/168 |
| 2003/0152292 A1 * | 8/2003 | Scott et al. | 382/298 |

OTHER PUBLICATIONS

Lori Tyahla :"The Hubble Space Telescope- Hubble's Optic", Mar. 3, 2006, pp. 1-3.

* cited by examiner

*Primary Examiner* — Frank G Font
(74) *Attorney, Agent, or Firm* — Mark M. Friedman

(57) ABSTRACT

A low orbit optical imaging satellite has a long thin satellite body housing an optical telescope arrangement. A major part of the telescope arrangement has its optical axis roughly parallel to the direction of elongation and includes a mirror arrangement deployed to direct a line of sight of the optical telescope out sideways from the direction of elongation. The transverse dimensions of the satellite body are preferably minimized to be close to the optical aperture dimension of the optical telescope, thereby providing a high ballistic coefficient and high orbit lifetime for orbits in the low thermosphere.

16 Claims, 7 Drawing Sheets

LOW ORBIT MISSILE-SHAPED SATELLITE FOR ELECTRO-OPTICAL EARTH SURVEILLANCE AND OTHER MISSIONS

RELATED APPLICATIONS

This patent application is a U.S. National Phase Application of PCT/IL2007/000584 filed on May 13, 2007, which also claims benefit of IL Application No. 175596 filed May 11, 2006, expired.

FIELD AND BACKGROUND OF THE INVENTION

The present invention relates to surveillance satellites and, in particular, it concerns a low orbit missile-shaped satellite for electro-optical earth surveillance and other missions.

Earth surveillance satellites are usually designed to stay in high enough orbits (typically 350-800 km), where the residual atmospheric drag is negligible. Their specific shape and their cross section are therefore of no significant importance. These relatively high altitude orbits impose relatively large aperture optics to achieve a required ground resolution, resulting in satellite weight of several hundreds of kilograms. Changing a satellite orientation is a relatively slow process based on conservation of momentum using reaction wheels. As a result, these satellites are limited in term of observing several regions of interest during limited time interval. These satellites are usually designed to stay in orbit for several years, requiring very high reliability. Moreover, the satellite must be highly economical on expendable resources such as fuel.

In the past, surveillance satellites were launched to low orbits (~200 km) in order to achieve high resolution. These satellites were very big (their weight was several tons) since they required a lot of fuel to overcome the atmospheric drag.

For the two cases described above the launch is very expensive and the 'cost per image' is very high.

Therefore, there is a need for satellite which is relatively inexpensive, can be launched using low cost boosters and can make large number of observations in a short time.

SUMMARY OF THE INVENTION

The present invention is a low orbit missile-shaped satellite for electro-optical earth surveillance.

According to the teachings of the present invention there is provided, a low orbit optical imaging satellite comprising: (a) an elongated satellite body having a direction of elongation, a length parallel to the direction of elongation and two transverse dimensions perpendicular to the direction of elongation and to each other; and (b) an optical telescope arrangement deployed within the satellite body, a major part of the telescope arrangement having an optical axis substantially parallel to the direction of elongation, the telescope arrangement including a mirror arrangement deployed to direct a line of sight of the optical telescope in a direction lateral to the direction of elongation, the optical telescope arrangement having an optical aperture dimension, wherein each of the two transverse dimensions is not more than 50 percent greater than the optical aperture dimension.

According to a further feature of the present invention, the two transverse directions are substantially equal.

According to a further feature of the present invention, the satellite body is substantially cylindrical.

According to a further feature of the present invention, the length is at least about five times greater than each of the transverse dimensions.

According to a further feature of the present invention, the length is at least about ten times greater than each of the transverse dimensions.

According to a further feature of the present invention, each of the two transverse dimensions is not more than 20 percent greater than the optical aperture dimension, and most preferably, not more than 10 percent greater than the optical aperture dimension.

According to a further feature of the present invention, the mirror arrangement includes at least one gimbaled mirror and a mirror control system for adjusting the mirror to direct the line of sight towards a location of interest.

According to a further feature of the present invention, there is also provided an attitude control system associated with the optical telescope arrangement, and wherein the optical telescope arrangement is mounted relative to the satellite body via a mounting having at least one axis of relative rotation, the mounting being selectively lockable such that, in a first mode of operation, the mounting is locked so that the attitude control system controls the attitude of the satellite and, in a second mode of operation, the mounting is released such that the attitude control system is operative to rotate the line of site of the optical telescope arrangement about at least one axis independent of the satellite body.

According to a further feature of the present invention, the satellite body further includes an attitude control system configured to maintain the satellite body with the direction of elongation parallel to a direction of motion of the satellite body.

According to a further feature of the present invention, at least part of the optical telescope arrangement is mounted so as to be rotatable about an axis parallel to the direction of elongation, and wherein the attitude control system is configured to rotate the at least part of the optical telescope arrangement to function as a reaction wheel.

According to a further feature of the present invention, the at least part of the optical telescope arrangement includes at least one mirror of the mirror arrangement, and wherein the at least one mirror is gimbaled for motion about two axes.

According to a further feature of the present invention, the entirety of the optical telescope arrangement is mounted rotatably about the axis parallel to the direction of elongation.

According to a further feature of the present invention, there is also provided a propulsion system initially associated with the satellite body and configured to bring the satellite body into an orbital path around the Earth at an altitude of between about 200 and about 500 kilometers.

According to a further feature of the present invention, the propulsion system includes a plurality of stages, and wherein a final stage of the propulsion system is configured to remain connected to the satellite body during orbit of the satellite body, the satellite body together with the final stage of the propulsion system having a ballistic constant greater than a ballistic constant of the satellite body alone.

There is also provided according to the teachings of the present invention, a method for imaging the surface of the Earth comprising: (a) providing a satellite having: (i) an elongated satellite body having a direction of elongation, a length parallel to the direction of elongation and two transverse dimensions perpendicular to the direction of elongation and to each other, and (ii) an optical telescope arrangement deployed within the satellite body, a major part of the telescope arrangement having an optical axis substantially parallel to the direction of elongation, the telescope arrangement including a mirror arrangement deployed to direct a line of sight of the optical telescope in a direction lateral to the direction of elongation, the optical telescope arrangement having an optical aperture dimension, wherein each of the two transverse dimensions is not more than 50 percent greater than the optical aperture dimension; (b) propelling the satellite into an orbital path around the Earth at an altitude of between about 200 and about 500 kilometers; (c) maintaining the direction of elongation substantially parallel to a direction of motion of the satellite; and (d) employing the optical telescope arrangement to obtain images of the surface of the Earth.

Turning now to the definitions of various terms as used herein in the description and claims, reference is made to a length of the body of the satellite of the present invention parallel to its direction and elongation and two transverse dimensions perpendicular to the direction of elongation. It should be noted that the transverse dimensions referred to herein are the dimensions useful as an indication of the primary cross-sectional area, and neglecting any minor features (fins, antenna or the like) which may project outwards without contributing significantly to the area of the satellite presented when moving along the direction of elongation. The term "transverse", except where explicitly qualified as being "perpendicular", should be interpreted broadly as "generally sideways". The term "lateral" used to refer to the line of sight of the optical telescope relative to the direction of elongation encompasses any direction departing markedly from parallel, and typically within a range of 60 to 120 degrees relative to the direction of elongation. The term "folding mirror" is used herein to refer to a mirror which performs the function of "folding" the bundle of optical paths viewed by the optical telescope arrangement through a significant angle. Where reference is made to an altitude of orbit, unless otherwise specified, the altitude is the average altitude of the geometrical path of the orbit.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention provides a low orbit optical imaging satellite has a long thin satellite body housing an optical telescope arrangement. A major part of the telescope arrangement has its optical axis roughly parallel to the direction of elongation and includes a mirror arrangement deployed to direct a line of sight of the optical telescope out sideways from the direction of elongation. The transverse dimensions of the satellite body are preferably minimized to be close to the optical aperture dimension of the optical telescope, thereby providing a high ballistic coefficient and high orbit lifetime for orbits in the low thermosphere. The transverse dimensions are preferably no more than 50 percent greater than the optical aperture dimension, and more preferably no more than 20 percent, or even 10 percent greater.

The present invention describes a high resolution, earth surveillance, "missile-shaped" satellite with very low cross section and very low drag. This satellite can maintain a low orbit (circular or elliptical) around the earth. In certain preferred implementations, a few kilograms of fuel can keep this satellite for several months in orbit. This solution provides relatively inexpensive 'missile in orbit' and very cheap 'cost per image'.

Figure 1:
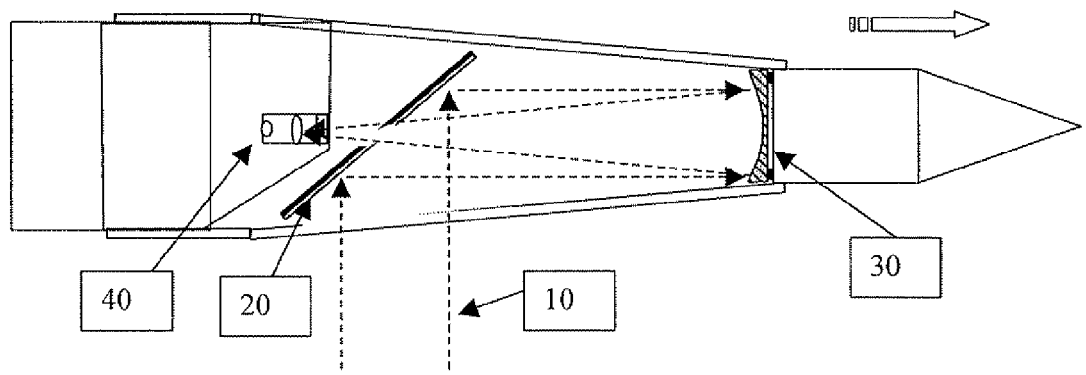
FIG. 1 is a schematic cross-sectional view taken through a first embodiment of a low orbit optical imaging satellite, constructed and operative according to the teachings of the present invention, based upon reflective optics.

A low altitude satellite can provide high ground sampled distance (GSD) with a relatively small aperture optical system. In the preferred embodiment of this invention the diameter of the optics determines the diameter of the satellite. Since the telescopes shape is cylindrical in principle and the low orbiting satellite is required to have a low cross-section to minimize its drag, the telescope optical axis in this invention is preferably oriented along the direction of propagation of the satellite as depicted in FIG. 1. The light reflected from the earth (or transmitted to it) below the satellite 10 is diverted by folding mirror 20 to propagate along the optical axis of the telescope. The mirror 30 focuses the light onto the detector 40. The telescope presented in this figure is based on reflective surfaces.

Figure 2:
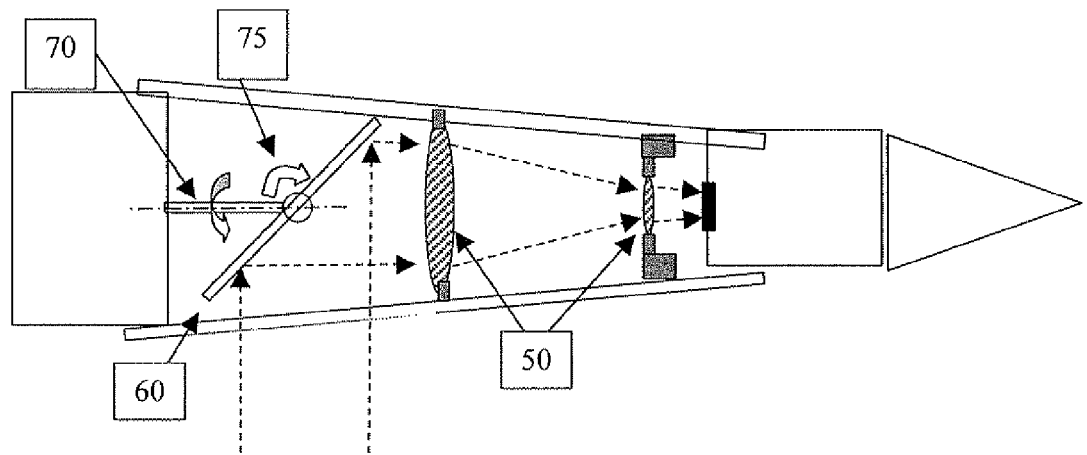
FIG. 2 is a schematic cross-sectional view taken through a second embodiment of a low orbit optical imaging satellite, constructed and operative according to the teachings of the present invention, based upon refractive optics.

According to this invention the optics of the telescope can also be based on refractive optical components as described in FIG. 2. In this embodiment lenses 50 are used instead of mirror 30.

The folding mirror 60 or 20 can be mounted on gimbals (schematically depicted as axis 70 and 75) which enable tilting of the mirror in various orientations and thereby change the direction of the telescope's optical axis. In yet another embodiment of this invention, the first axis of tilting the mirror is along the axis of the satellite 70 (along the propagation) and on top of it the second axis 75 is tangential to it. This way, a specific point of interest on the ground, can be tracked during satellite propagation using mainly single axis (75).

In another embodiment of this invention the mirror 60 can be tilted only in one axis while rotation of the satellite provides steering in the other axis. This method is very effective since rotation of the satellite along the optical axis of the telescope can be achieved easily having low moment of inertia along this axis.

The satellite performs several maneuvers when not recording images. For example, the satellite reorients itself so that its solar cells face the sun for battery recharging. This maneuver is performed (in the case where the solar cells are packaged on the satellite body) by operation of reaction wheels. In yet another embodiment of this invention the movement of the mirror (or any other optical setup) by its gimbals is used for performing this maneuver. For example by spinning the mirror 60 using the first gimbals 70, the satellite will rotate to the opposite direction. Stopping the rotation of the mirror will stop the rotation of the satellite at the required orientation. Performing this rotation at different mirror angles of gimbals 75 create different moment of inertia of the mirror and consequently enable to fine tune the satellite rotation.

Figure 3:
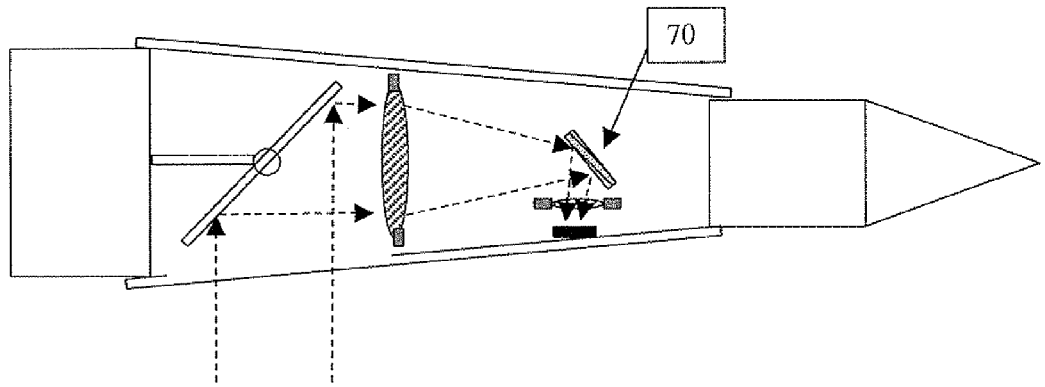
FIG. 3 is a schematic cross-sectional view taken through a third embodiment of a low orbit optical imaging satellite, constructed and operative according to the teachings of the present invention, based upon refractive optics with a primary tracking mirror and a secondary deflectable correction mirror.

As the satellite propagates in orbit, the image generated on the detector can be smeared during the integration time of the detector. The induced blur of the image can be significantly reduced by continuously scanning the folding mirror 60 backward so that the Line Of Sight (LOS) remains constant on the observed surface. However, in some cases it is preferred to introduce this correction by using a different mirror as described in FIG. 3. The mirror 70 is a fast moving mirror that does the fine compensation for the shift of the LOS. This mirror can also be used for compensation of thermal expansion of the optics structure of the telescope.

In all these embodiments of the invention, the satellite has an elongated shape, most preferably cylindrical; therefore it introduces a small cross section to the flow of residues of atmosphere. Consequently, the ballistic coefficient of the satellite (proportional to the mass divided by the cross-section) is very high and the drag force is low.

Figure 4:
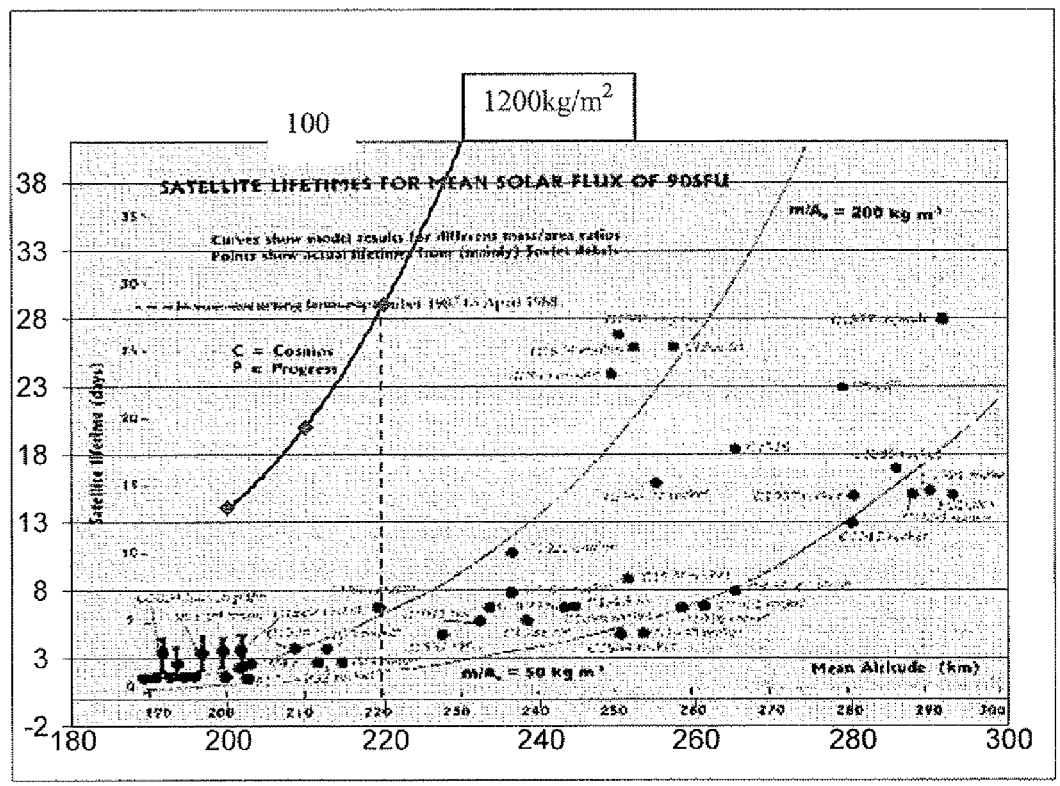
FIG. 4 is a graph illustrating satellite orbit lifetime as a function of initial orbit altitude for a range of different ballistic constants.

In FIG. 4 the horizontal axis represents the original altitude of a satellite and the vertical axis represent the numbers of days that the satellite will be in orbit before the atmospheric drag will cause it to fall. It is apparent that a satellite designed according to this invention has substantially higher ballistic parameter, and will stay in orbit much longer (for example, as described in curve 100).

In yet another embodiment of this invention, the last stage of a rocket propulsion system used to launch the satellite into orbit remains attached to the satellite, thereby increasing further its ballistic coefficient, assuming that the additional mass is larger than the additional area.

In another embodiment of this invention a linear array of detectors is used to image the observed surface using a swath (scanning) motion as is used in certain other satellites. The swath may be swept either by an active scanning motion or by the motion of the satellite as it advances along its orbit.

In another embodiment of this invention, a good coverage of the area is achieved by imaging the region of interest onto several Focal Plane Arrays (FPA—a matrix of detectors).

Figure 5:
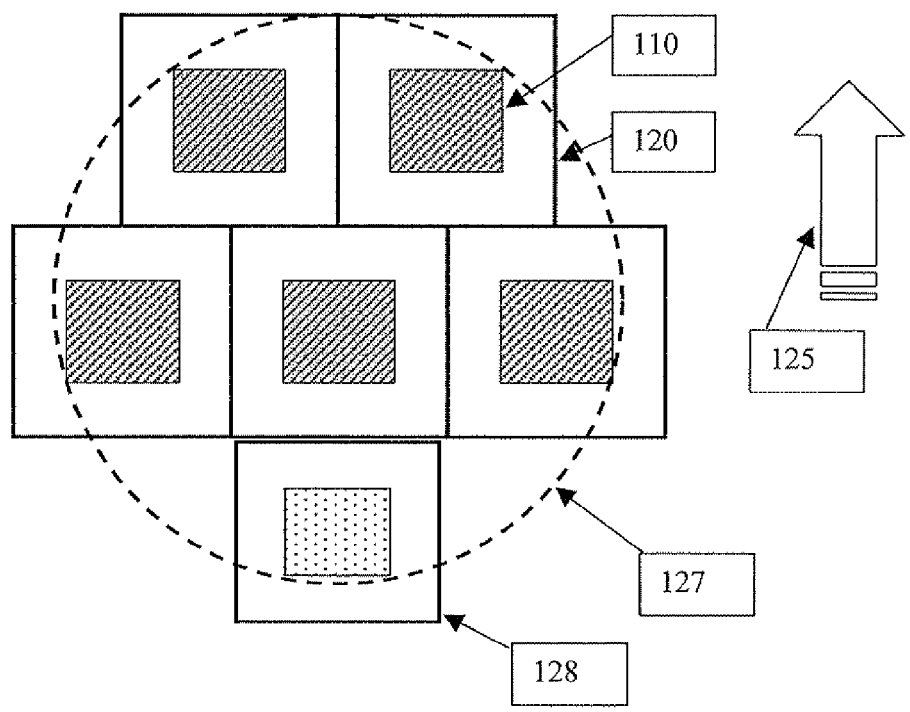
FIG. 5 is a schematic plan view of an arrangement of staggered focal plane array detectors for use in certain preferred implementations of the present invention.

According to this invention the FPAs are arranged in a staggered configuration in the focal plane of the telescope. An example of a staggered arrangement is depicted in FIG. 5. 110 represent the active area of the FPAs and 120 represent the size of the FPAs housing. The required FOV of the telescope (projected on the focal pane) is described as circle 127. Additional FPA 128 can be introduced in the FOV. This component can be used for high resolution imaging (as a redundant FPA) or as low resolution, high frame rate image recorder for extracting the propagation of the line of sight (as will be explained in FIG. 12).

These staggered FPAs are oriented perpendicular the propagation direction of the LOS 125. The way this configuration covers all the surface of interest is described in FIG. 6. The first squares 130 are the first image generated by the five FPAs. These squares are labeled 1. As the Line Of Sight (LOS) of the telescope propagates, more cascaded images are recorded (labeled 2, 3, 4 and 5). Consequently the entire observed surface is imaged.

The FPAs can be based on CCD, CMOS, InSb or any other known technology for image recording in any optical waveband of interest including, but not limited to, the visible band (VIS), near IR (NIR) or in Mid Wave IR (MWIR).

Coarse stabilization of the LOS can be performed by:
The reaction wheels of the satellite
Magnetic torque rods
The thrusters of the satellite
The folding mirrors 70 or 60

Figure 7:
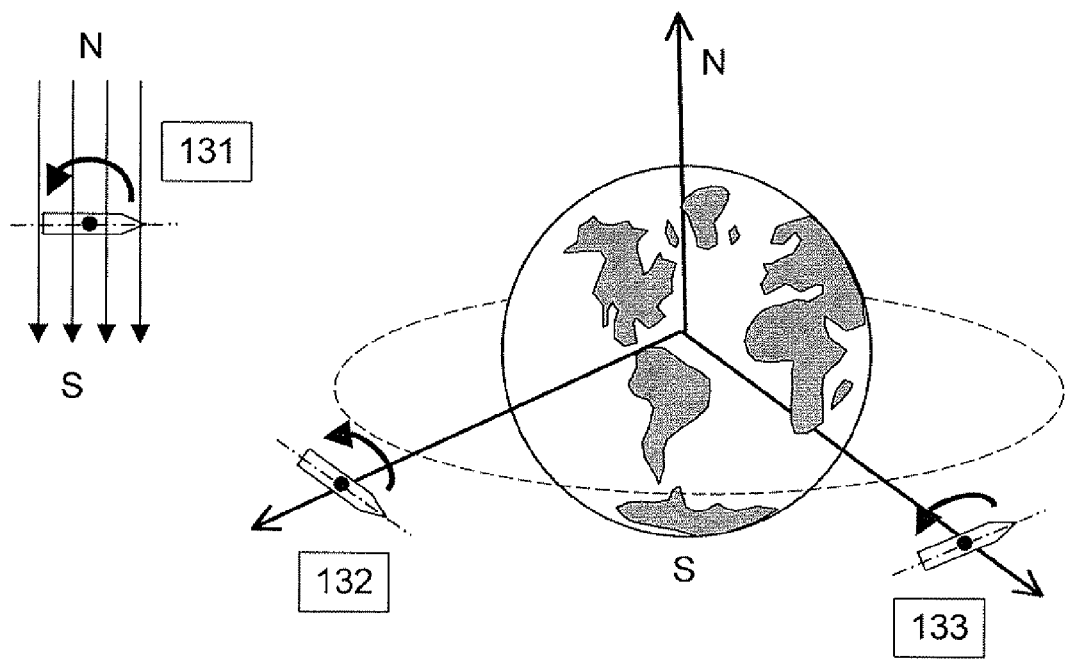
FIG. 7 is a schematic diagram illustrating the operation of a magnetic torque rod.

Magnetic torque rod is a known technology used in satellites to introduce torque to the satellite from the magnetic field of the satellite. It is well known that the longer the rod is the more torque it introduces. In one of the embodiments of this invention the torque rod is placed along the elongated body of the satellite and its length is substantially most of the length of the satellite. Consequently, in the presence of external magnetic field it will introduce a torque in one axis as depicted in 131 in FIG. 7. In one embodiment of this invention the satellite is rotating around the earth while maintaining orientation relative to the direction of propagation. Consequently the orientation of the magnetic torque rod is changing (132 and 133). This way the single magnetic elongated torque rod is effective in two axes.

Figure 6:
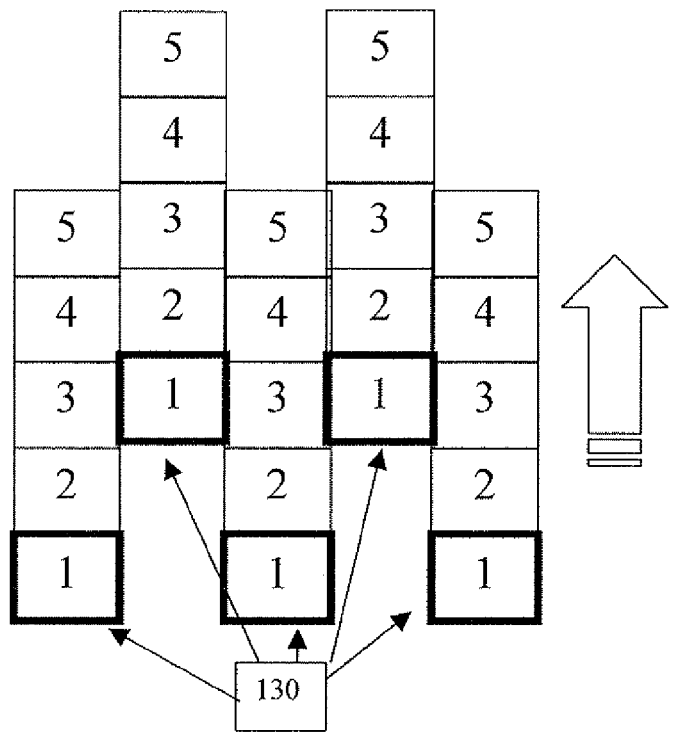
FIG. 6 is a schematic representation of the sequential fields of view of the detectors of FIG. 5 during motion of the satellite.

The method described in FIG. 6 of recording the surface of interest requires that the image of the surface will propagate along the staggered FPA as depicted by arrow 125. However, if the folding mirror is rotated in large angles around an axis that is not perpendicular to the satellite propagation (for example axis 70) then this requirement is not fulfilled. This limitation can be solved according to this invention either by using a single axis 75 and rotating the satellite around the other axis or by rotating the staggered FPAs in the focal plane so their orientation matches the propagation of the image in the focal plane.

Figure 8:
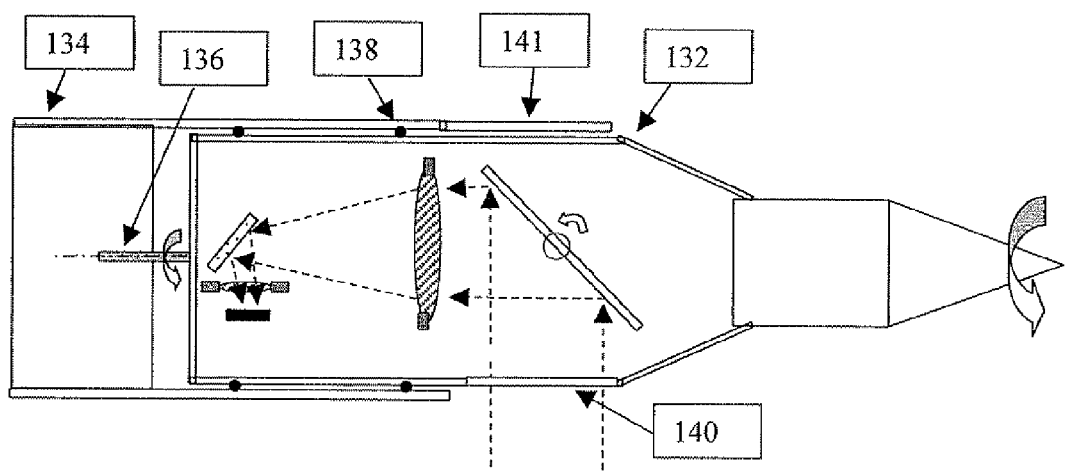
FIG. 8 is a schematic cross-sectional view taken through an implementation of the present invention in which an optical arrangement is located in a rotatable portion of the satellite.

In yet another embodiment of this invention, all the optical setup of the telescope is rotated relative to the rest of the satellite as shown in FIG. 8. In this embodiment of the invention the telescope and the mirrors are placed in a separate section 132 in front of the rest of the satellite 134. This section is rotated using an axis 136 and a bearing 138. The mechanical arrangement can be different and this rotating section can be placed in the center or the back of the satellite, as long as all the optical setup is rotated as a single unit and the mirror is tilted in addition to the rotation.

Rotation of all the optical section relative to the rest of the satellite enables fast change of LOS. Furthermore, it enables rotation of the opening away from the direction of satellite propagation in order to prevent damage to the optics by the particles in the upper atmosphere. If the satellite section 138 has an extension in part of it 141 then the optical section can be rotated so that the opening 140 will be completely covered (facing upward in this figure). This extension can also be used to shield the optical section from the light of the sun and this way reduces thermal stresses in the optical section.

Figure 9:
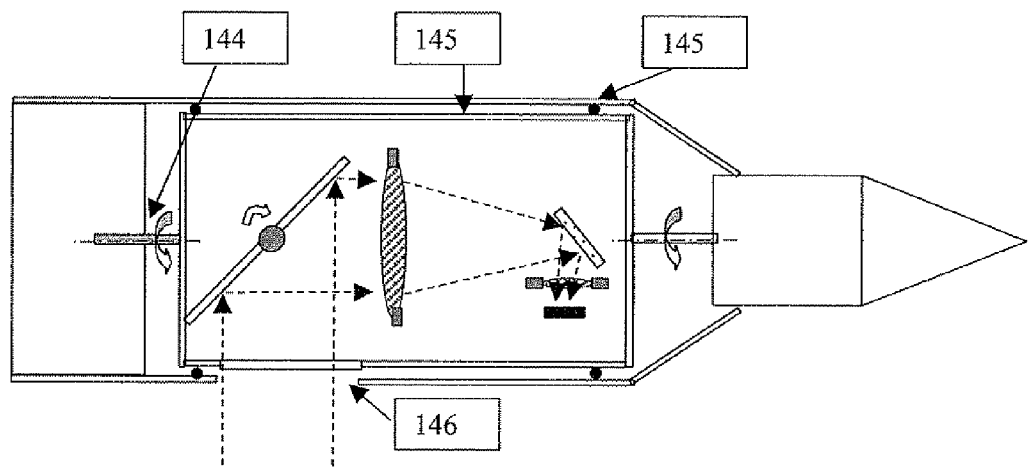
FIG. 9a is schematic cross-sectional view taken through an implementation of the present invention in which an optical arrangement is rotatably mounted within the satellite.

In yet another embodiment of this invention the optical section of the satellite is in the center of the satellite as described schematically in FIG. 9. Here, the internal optical section 145 of the telescope is rotated using axis 144 or bearings 145 or any other mechanical means. The openings 146 of the external satellite structure and of the internal rotating optical section are aligned during optical operation and are moved out of alignment when not in use in order to close the openings and prevent damage to the optics. The external opening must be large in order to enable large field of regard for the rotating telescope and for the tilting mirror.

Figure 10:
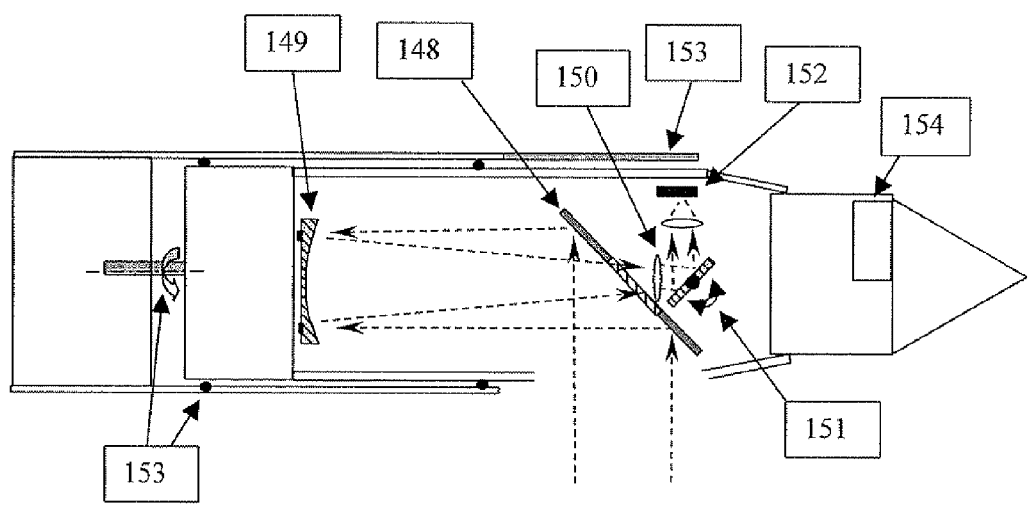
FIG. 10a is schematic cross-sectional view taken through an implementation of the present invention in which an optical arrangement is located in a rotatable portion of the satellite and employing two controllable mirrors.

FIG. 10 describes schematically another embodiment of this invention that is based on a combination of reflective-optics and refractive-optics. The light is reflected by mirror 148. This mirror can be tilted in order to change the direction of LOF. The light is focused by mirror 149 through an opening in mirror 148 onto refractive optics 150. Mirror 151 does fine tuning and corrections to the LOS. The light is then focused onto detector 152. All the optical section can be rotated using axis and bearings 153. When not in use the optical section can be rotated to be covered by extension 153.

In yet another embodiment of this invention the rotating section includes only the front section 148, 150 151 and 152. The main focusing mirror 149 is circularly symmetric and therefore doesn't require to be rotated.

Every satellite has an attitude control system. This system includes orientation sensors such as optical gyros and actuators such as reaction wheels, momentum wheels and moment gyro.

In yet another embodiment of this invention the attitude control of the satellite is placed at the optical section (schematically depicted as 154). The optical section is preferably locked to the rest of the satellite when in orbit. However, during observation the optical section is released and rotates freely about at-least one axis (using bearing and axis 153) relative to the rest of the satellite. In this manner, the attitude control that initially controlled all the satellite may selectively be used to control only the optical section and hence the LOS. The low moment of inertia of the optical section enables fast steering. After observation the axis 153 is relocked and the attitude control controls the entire satellite once more.

Figure 11:
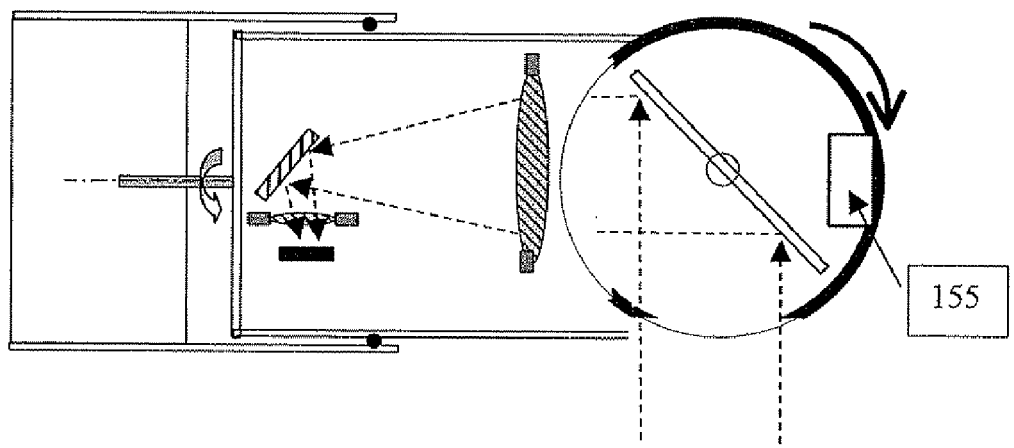
FIG. 11 is a schematic cross-sectional view taken through a further implementation of the present invention.

FIG. 11 describes schematically an embodiment of this invention where the attitude control 155 is attached to the folding mirror. This way during observation the attitude control can direct the LOS in two axes.

FIGS. 10 and 11 are only examples of a more generally applicable approach and corresponding method according to the teachings of the present invention according to which the LOS is controlled using the attitude control of the satellite. The method presented here is inherently based on locking the optical section to the satellite when not observing so that the attitude control can maneuver all the satellite. During observation the lock between the optical section and the satellite is released so that the attitude control controls only the attitude of the optics.

In yet another embodiment of this invention, the configuration described in FIGS. 10 and 11 also includes the directional communication antenna of the satellite with the optical section. In this manner, the satellite attitude control can also be used for aligning the communication antenna in the same way it controls the optical LOS.

Figure 12:
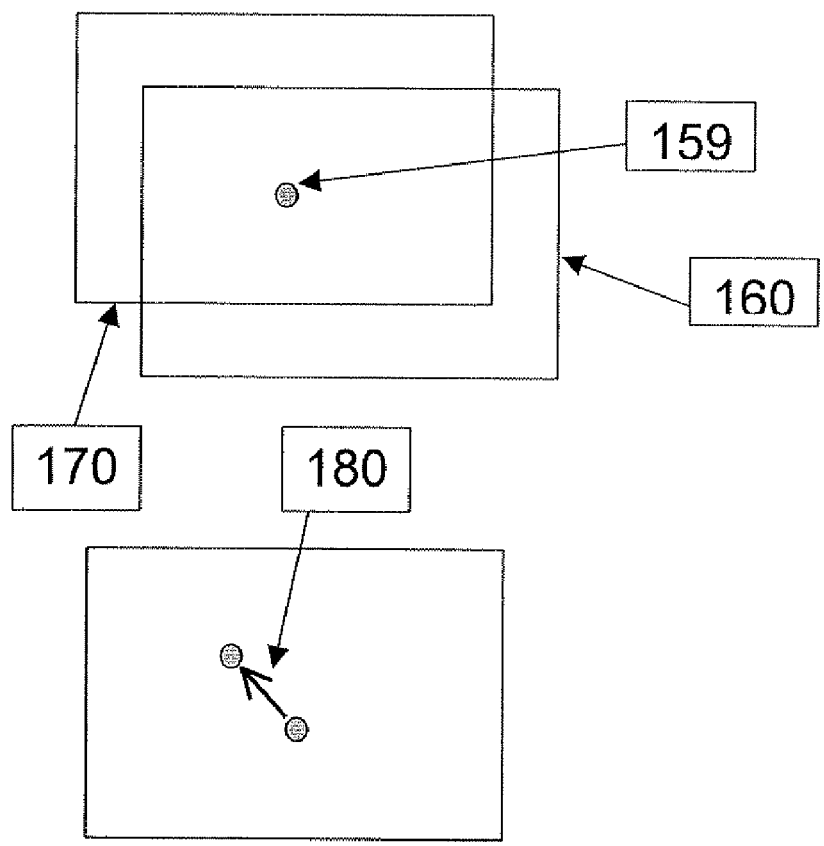
FIG. 12 is a schematic representation of a principle of image processing for aligning or stabilizing a desired line of sight according to the teachings of the present invention.

In order to define a required correction for the optics, the satellite should include a navigation system which will give the orientation of the LOS and its movement. Reference is made to FIG. 12. In a particularly preferred non-limiting embodiment of this invention, the image recorded by the FPAs is used for this navigation. Automatically identified location 159 in two cascaded images 150 and 160 (preferable of overlapping FOVs) are compared and the LOSs speed 180 is extracted. In case of limited resources for image analysis, the FPAs can record an image using its low format mode or an additional small FOV FPA that can be placed adjacent to the existing staggered FPAs. This navigation process can be performed around the time of the high resolution recording of the region of interest.

The fact that this satellite has an extremely low moment of inertia, and the fact that this satellite will probably be in orbit for a relatively short time (less then a year) make the utilization of micro thrusters based on MEMS very attractive. In yet another embodiment of this invention the maneuvering of the satellite is performed using micro thrusters based on MEMS.

This lightweight, low-orbit satellite enables the use of relatively low weight launcher and therefore enable air launch from an aircraft. Another option is launching several such a light satellites in one big launcher—thus dividing the launch+launcher cost between several satellites/missions.

In the above description of the invention, only schematic descriptions of known technologies were provided. The configuration of the telescope was simplified for clarity; however practical space telescopes are much more complicated and include many more optical components in order to reduce aberrations. These configurations also include combinations of refractive, reflective and also in some cases diffractive elements. Some telescope configurations include afocal configuration where the scanning mirror 70 is passed at the afocal section (where the rays coming from the same direction are parallel) of the optics. All these configurations are included in this invention as long as their integration into the satellite is according to the above description.

This invention also includes the case where the LOS is fine tuned by shifting the detector in the focal plane of the telescope.

Figure 13A:
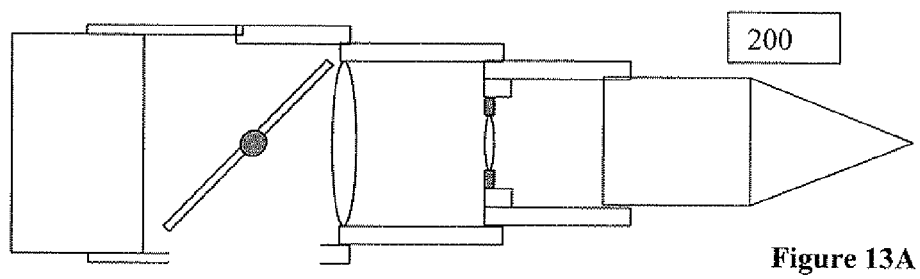
FIGS. 13A and 13B are schematic cross-sectional views taken through a further implementation of the satellite, constructed and operative according to the teachings of the present invention, employing a collapsible optical arrangement to reduce the launch volume of the optical arrangement, the satellite being shown in the opened and collapsed states, respectively.
Figure 13B:
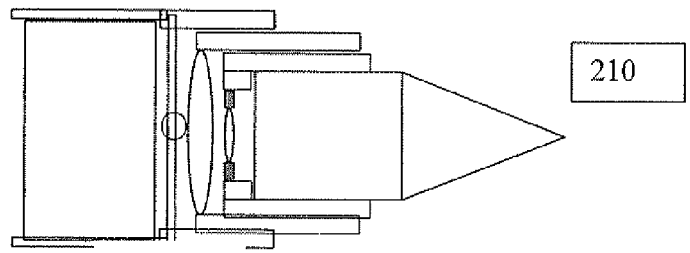

The optical telescope arrangement is basically inefficient in term of volume. The large gap between the optical components can take substantial volume. This inefficiency can be expensive when launching the satellite into space. FIG. 13 describes a satellite as described in previous embodiments. The satellite can include refractive optical elements 200 or it can include reflective optics. According to this embodiment of the invention the satellite is telescopically folded when packed inside the launcher as described in 210. This folding can cause some optical misalignment after extraction. Therefore, active alignment (a well known technology) or adaptive optics can be used for the alignment. This folded packaging configuration can be used with all previous embodiments of this invention. The folding can be partial, where only part of the optics is folded.

In summary, features believed to be of particular importance include, but are not limited to:
1. Low orbit missile-shaped satellite, where the satellite prolonged cylindrical symmetry axes is oriented continuously parallel to the satellite direction of propagation (velocity).
2. Low orbit missile-shaped satellite where the satellite has low cross section in its direction of motion, thereby it has low drag and high ballistic coefficient (m/A) that enables relatively long duration of the satellite in orbit.

3. Low orbit missile-shaped satellite with increased ballistic coefficient achieved by leaving the last stage of the launching rocket attached to it, so that the m/A of the satellite+dry last stage is greater than the m/A of the satellite alone.
4. Low orbit missile-shaped satellite that has very low inertia with respect to its cylindrical symmetry axis.
5. Low orbit missile-shaped satellite for earth surveillance mission where the telescope optical axis is packaged parallel to the satellite cylindrical axis so that the whole optics is conformal with the satellite shape and the cross section of the satellite is almost that of the telescope optical aperture.
6. Low orbit missile-shaped satellite for earth surveillance mission where the telescope optical axis is arranged parallel to the satellite cylindrical axis and a folding lightweight mirror external to the optics is used to direct the camera LOS towards the earth.
7. As in 6 where the folding mirror is mounted on two-axis gimbals in order to rotate the line of sight (LOS) towards regions of interest.
8. As in 6 where the gimballed folding mirror, while not in use for pointing the telescope LOS, is used as a reaction wheel that orients the whole satellite mainly around its low axis inertia. Changing the angle of the folding mirror in one axis is used to change its inertia, while changing the angle of the folding mirror in the other axis is used to change the satellite roll angle accordingly.
9. Low orbit missile-shaped satellite for earth surveillance mission where imaging of the earth is accomplished using either a line scanner or multiple focal plane arrays (FPAs) arranged in a staggered overlapping form, so that during the satellite motion the earth is covered with overlap in two directions: in the direction perpendicular to the motion by the arrangement of the FPAs and in the direction of the satellite motion by over-sampling the FPAs.
10. Low orbit missile-shaped satellite for earth surveillance mission where pointing the LOS to the region of interest is accomplished by tilting the folding mirror in two axes or by rolling the whole satellite around its low inertia symmetry axis or by using both means.
11. Low orbit missile-shaped satellite for earth surveillance mission where pointing the LOS to the region of interest is achieved by rotating the whole cylindrical optical assembly within the satellite using inner roll gimbals and a folding mirror.
12. Low orbit missile-shaped satellite for earth surveillance mission where pointing the LOS to the region of interest is achieved by rotating the whole cylindrical optical assembly outside the satellite using outer roll gimbals and a folding mirror.
13. Low orbit missile-shaped satellite for earth surveillance mission with low FOV FPA at standard video frame rate that is used for navigation, i.e.: pointing to a predetermined region of interest and correcting the rough satellite pointing means by using digital map stored in the satellite and image correlation techniques. In this way we use the imaging system as an earth tracker. Using the known position of the satellite (GPS) and an identified point on earth, very accurate LOS can be extracted.
14. As in 11 where the same additional low FOV FPA is used for tracking the region of interest for stabilizing the LOS during the detector integration time using a correlation tracker.
15. Low orbit missile-shaped satellite for earth surveillance mission where fine stabilization of the LOS and V/R compensation during detector integration are accomplished using either an external to the optics folding mirror or a fast scanning mirror (backscan mirror) in the optical path or both.
16. As in 1 where the satellite farther includes a magnetic rod placed along the satellite longer axis where the length of the rod is substantially the length of the satellite.
17. A satellite having an attitude control system where at least part of it is located at the optical section of the satellite and where the optical section can be rotated freely around at least one axis relative to the rest of the satellite.
18. As in 17 where the optical satellite has a locking mechanism to lock the optical section to the rest of the satellite and thereby enabling the attitude system to control all the satellite.

It will be appreciated that the above descriptions are intended only to serve as examples, and that many other embodiments are possible within the scope of the present invention as defined in the appended claims.

What is claimed is:
1. A low orbit optical imaging satellite comprising:
(a) an elongated satellite body having a direction of elongation, a length parallel to said direction of elongation and two transverse dimensions perpendicular to said direction of elongation and to each other; and
(b) an optical telescope arrangement deployed within said satellite body, a major part of said telescope arrangement having an optical axis substantially parallel to said direction of elongation, said telescope arrangement including a mirror arrangement deployed to direct a line of sight of said optical telescope in a direction lateral to said direction of elongation, said optical telescope arrangement having an optical aperture dimension,
wherein each of said two transverse dimensions is not more than 50 percent greater than said optical aperture dimension.
2. The satellite of claim 1, wherein said two transverse directions are substantially equal.
3. The satellite of claim 1, wherein said satellite body is substantially cylindrical.
4. The satellite of claim 1, wherein said length is at least about five times greater than each of said transverse dimensions.
5. The satellite of claim 1, wherein said length is at least about ten times greater than each of said transverse dimensions.
6. The satellite of claim 1, wherein each of said two transverse dimensions is not more than 20 percent greater than said optical aperture dimension.
7. The satellite of claim 1, wherein each of said two transverse dimensions is not more than 10 percent greater than said optical aperture dimension.
8. The satellite of claim 1, wherein said mirror arrangement includes at least one gimbaled mirror and a mirror control system for adjusting said mirror to direct said line of sight towards a location of interest.
9. The satellite of claim 1, further comprising an attitude control system associated with said optical telescope arrangement, and wherein said optical telescope arrangement is mounted relative to said satellite body via a mounting having at least one axis of relative rotation, said mounting being selectively lockable such that, in a first mode of operation, said mounting is locked so that said attitude control system controls the attitude of the satellite and, in a second mode of operation, said mounting is released such that said attitude control system is operative to rotate said line of site of said optical telescope arrangement about at least one axis independent of said satellite body.

10. The satellite of claim 1, wherein said satellite body further includes an attitude control system configured to maintain said satellite body with said direction of elongation parallel to a direction of motion of the satellite body.

11. The satellite of claim 10, wherein at least part of said optical telescope arrangement is mounted so as to be rotatable about an axis parallel to said direction of elongation, and wherein said attitude control system is configured to rotate said at least part of said optical telescope arrangement to function as a reaction wheel.

12. The satellite of claim 11, wherein said at least part of said optical telescope arrangement includes at least one mirror of said mirror arrangement, and wherein said at least one mirror is gimbaled for motion about two axes.

13. The satellite of claim 11, wherein the entirety of said optical telescope arrangement is mounted rotatably about said axis parallel to said direction of elongation.

14. The satellite of claim 1, further comprising a propulsion system initially associated with said satellite body and configured to bring said satellite body into an orbital path around the Earth at an altitude of between about 200 and about 500 kilometers.

15. The satellite of claim 14, wherein said propulsion system includes a plurality of stages, and wherein a final stage of said propulsion system is configured to remain connected to said satellite body during orbit of said satellite body, said satellite body together with said final stage of said propulsion system having a ballistic constant greater than a ballistic constant of said satellite body alone.

16. A method for imaging the surface of the Earth comprising:
(a) providing a satellite having:
  (i) an elongated satellite body having a direction of elongation, a length parallel to said direction of elongation and two transverse dimensions perpendicular to said direction of elongation and to each other, and
  (ii) an optical telescope arrangement deployed within said satellite body, a major part of said telescope arrangement having an optical axis substantially parallel to said direction of elongation, said telescope arrangement including a mirror arrangement deployed to direct a line of sight of said optical telescope in a direction lateral to said direction of elongation, said optical telescope arrangement having an optical aperture dimension,
  wherein each of said two transverse dimensions is not more than 50 percent greater than said optical aperture dimension;
(b) propelling said satellite into an orbital path around the Earth at an altitude of between about 200 and about 500 kilometers;
(c) maintaining said direction of elongation substantially parallel to a direction of motion of the satellite; and
(d) employing said optical telescope arrangement to obtain images of the surface of the Earth.

\* \* \* \* \*